United States Patent
Grigsby et al.

(10) Patent No.: US 8,244,274 B2
(45) Date of Patent: Aug. 14, 2012

(54) ENHANCED WIRELESS ACCESS POINT COMMUNICATIONS WHILE TRAVELING

(75) Inventors: Travis M. Grigsby, Austin, TX (US); Mark E. Peters, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 1182 days.

(21) Appl. No.: 12/050,429

(22) Filed: Mar. 18, 2008

(65) Prior Publication Data

US 2009/0239549 A1 Sep. 24, 2009

(51) Int. Cl.
*H04W 24/00* (2009.01)
(52) U.S. Cl. ............. 455/456.1; 370/330; 370/331; 370/332; 370/333
(58) Field of Classification Search ............ 455/456.1; 370/330–336
See application file for complete search history.

(56) References Cited

U.S. PATENT DOCUMENTS

| | | | |
|---|---|---|---|
| 2004/0043767 A1* | 3/2004 | Tsutsumi et al. | 455/432.1 |
| 2006/0009266 A1* | 1/2006 | Hara et al. | 455/572 |
| 2006/0030350 A1* | 2/2006 | Mitchell | 455/522 |
| 2009/0037979 A1* | 2/2009 | Dellaratta et al. | 726/2 |
| 2009/0086660 A1* | 4/2009 | Sood et al. | 370/311 |
| 2009/0203388 A1* | 8/2009 | Karaoguz | 455/456.3 |

* cited by examiner

*Primary Examiner* — Marcos Batista
(74) *Attorney, Agent, or Firm* — Robert A. Voight, Jr.; Winstead, P.C.

(57) ABSTRACT

A method, system and computer program product for enhancing the acquisition of data from a wireless access point during a window of acquisition. A wireless device in a vehicle obtains a list of wireless access points positioned along a route being traveled by a user of the wireless device. The wireless device acquires its current location and identifies the closest upcoming wireless access point in connection with its current location. If the wireless device had previously had a session with the upcoming wireless access point, then the wireless device continues sending packets to the upcoming wireless access point from the point of previous termination with the upcoming wireless access point until the session is restarted. The wireless device then accesses data from the upcoming wireless access point during the remaining window of acquisition.

20 Claims, 7 Drawing Sheets

ENHANCED WIRELESS ACCESS POINT COMMUNICATIONS WHILE TRAVELING

TECHNICAL FIELD

The present invention relates to wireless communication systems, and more particularly to enhancing the acquisition of data from a wireless access point by having advance knowledge of the locations of wireless access points.

BACKGROUND OF THE INVENTION

Traditionally, cables have been used to connect devices (e.g., desktop computers, printers, modems, and servers) to one another to form a network, such as a local area network ("LAN"). In a LAN, the networked devices are able to communicate with one another and to share information. If the LAN is connected to the Internet, the networked devices can access the internet as well.

With the advent of wireless technology, suitably enabled devices can connect to a LAN without physically connecting to the network, thereby forming a wireless LAN ("WLAN"). Here, each device is equipped with a wireless communication card or an embedded wireless communication module that allows the device to send and receive data transmissions to and from a "wireless access point." The wireless access point is typically attached to the wired LAN and can include a router so that it also provides a gateway to the Internet.

Typically, in order to access data from a network (e.g., Internet) via the wireless access point, the device has to establish a connection (i.e., start a session) with the wireless access point. This typically involves a series of transmissions between the device and the wireless access point, commonly referred to as "handshaking." After establishing a connection with the wireless access point, the device may then be able to access data, such as e-mail from an e-mail server, via the wireless access point.

Typically, wireless access points that are commercially available can communicate simultaneously with several devices (or clients) within a certain range. Within that range, the user of the client enjoys a full network connection, with the benefit of mobility. The wireless access point's range is typically a radius of approximately 45 m (indoors) to approximately 100 m (outdoors), but that can be affected by a number of factors, such as, for example, the location of the wireless access point, nearby obstructions, type of antenna, and power output of the wireless access point. Hence, the wireless access point's range is limited to a relatively small area.

Due to the wireless access point's limited range, drivers along a road, such as an interstate, may have a limited window of time (e.g., ten seconds) to access data within the wireless access point's range. That is, drivers along a road may have very limited time to locate the wireless access point, start a session with the wireless access point, which involves handshaking, and then access data via the wireless access point, such as acquiring e-mail from an e-mail server. In fact, based on the driver's speed, the driver may not even have time to locate the wireless access point, let alone establish a session with the wireless access point. If, however, the location of upcoming wireless access points were known, then the amount of data that can be accessed via the wireless access point may be maximized given the limited window of opportunity to access data.

BRIEF SUMMARY OF THE INVENTION

In one embodiment of the present invention, a method for enhancing acquisition of data from a wireless access point comprises retrieving a list of wireless access points. The method further comprises acquiring a current location of the user. Additionally, the method comprises identifying locations of wireless access points from the list of wireless access points in connection to the current location of the user. Furthermore, the method comprises identifying a closest wireless access point in connection to the current location of the user. Further, the method comprises communicating with the closest wireless access point at an earliest opportunity within a window of time for acquisition for the closest wireless access point The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWING

A better understanding of the present invention can be obtained when the following detailed description is considered in conjunction with the following drawings, in which.

DETAILED DESCRIPTION OF THE INVENTION

Figure 1:
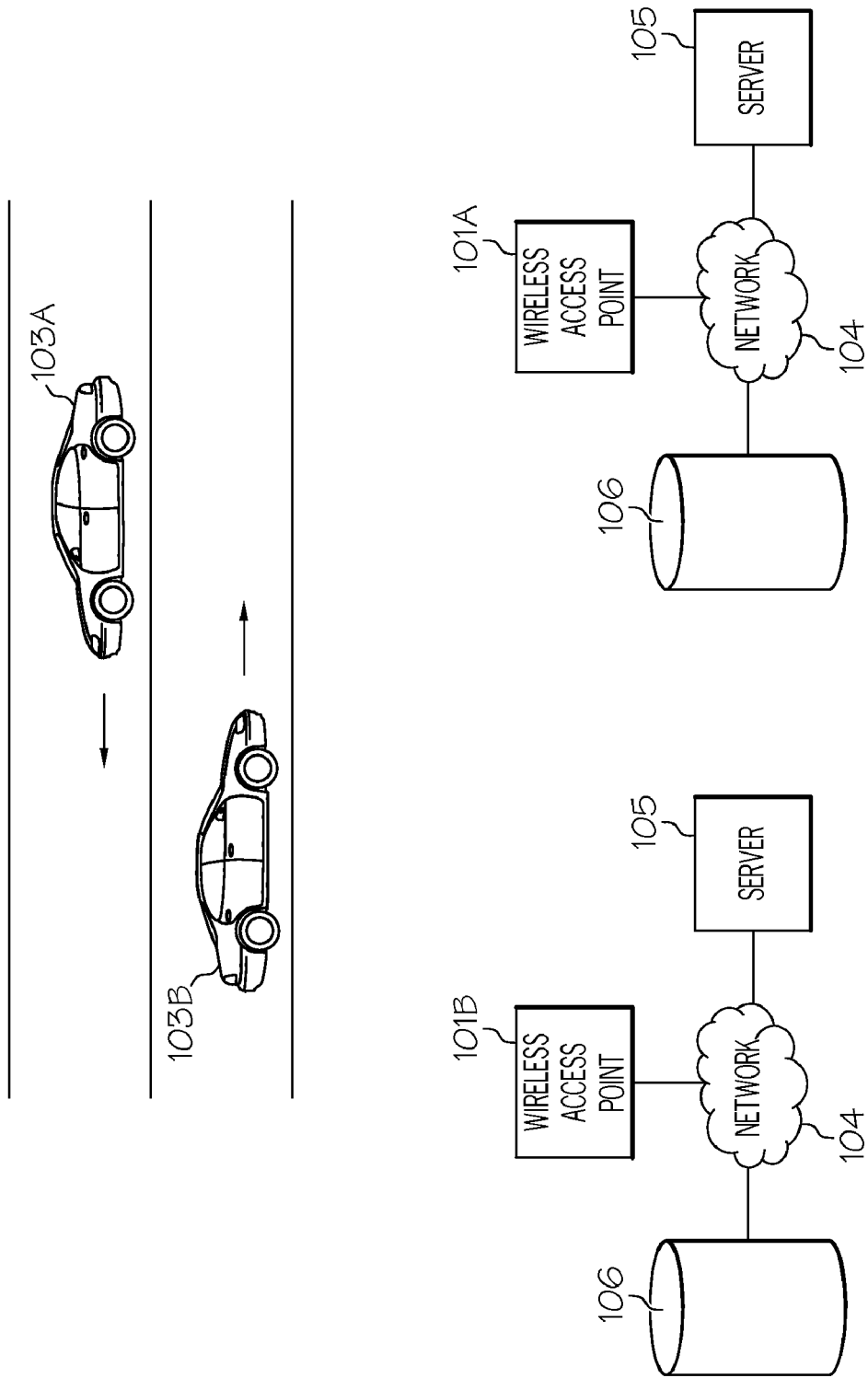
FIG. 1 is a diagram of a communication system including wireless access points positioned along a road which may be accessed by wireless devices in accordance with an embodiment of the present invention.

The present invention comprises a method, system and computer program product for enhancing the acquisition of data from a wireless access point during a window of acquisition. In one embodiment of the present invention, a wireless device in a vehicle obtains a list of wireless access points positioned along a route being traveled by a user of the wireless device. The wireless device acquires its current location and identifies the closest upcoming wireless access point in connection with its current location. If the wireless device had previously had a session with the upcoming wireless access point, then the wireless device continues sending packets to the upcoming wireless access point from the point of previous termination with the upcoming wireless access point until the session is restarted. The wireless device then accesses data from the upcoming wireless access point during the remaining window of acquisition. If, however, the wireless device had not previously had a session with the upcoming wireless access point, then the wireless device establishes a session with the upcoming wireless access point at the first opportunity within the window of acquisition using a known Service Set IDentifier (SSID) to reduce the handshaking. The wireless device then accesses data from the upcoming wireless access point during the remaining window of acquisition.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

As discussed in the Background section, wireless access points have a limited range of communication. Due to the wireless access point's limited range, drivers along a road, such as an interstate, may have a limited window of time (referred to herein as the "window of acquisition") to access data within the wireless access point's range. That is, drivers along a road may have very limited time to locate the wireless access point, start a session with the wireless access point, which involves handshaking, and then access data via the wireless access point, such as acquiring e-mail from an e-mail server. In fact, based on the driver's speed, the driver may not even have time to locate the wireless access point, let alone establish a session with the wireless access point, if, however, the location of upcoming wireless access points were known, then the amount of data that can be accessed via the wireless access point may be maximized given the limited window of opportunity to access data.

Figure 2:
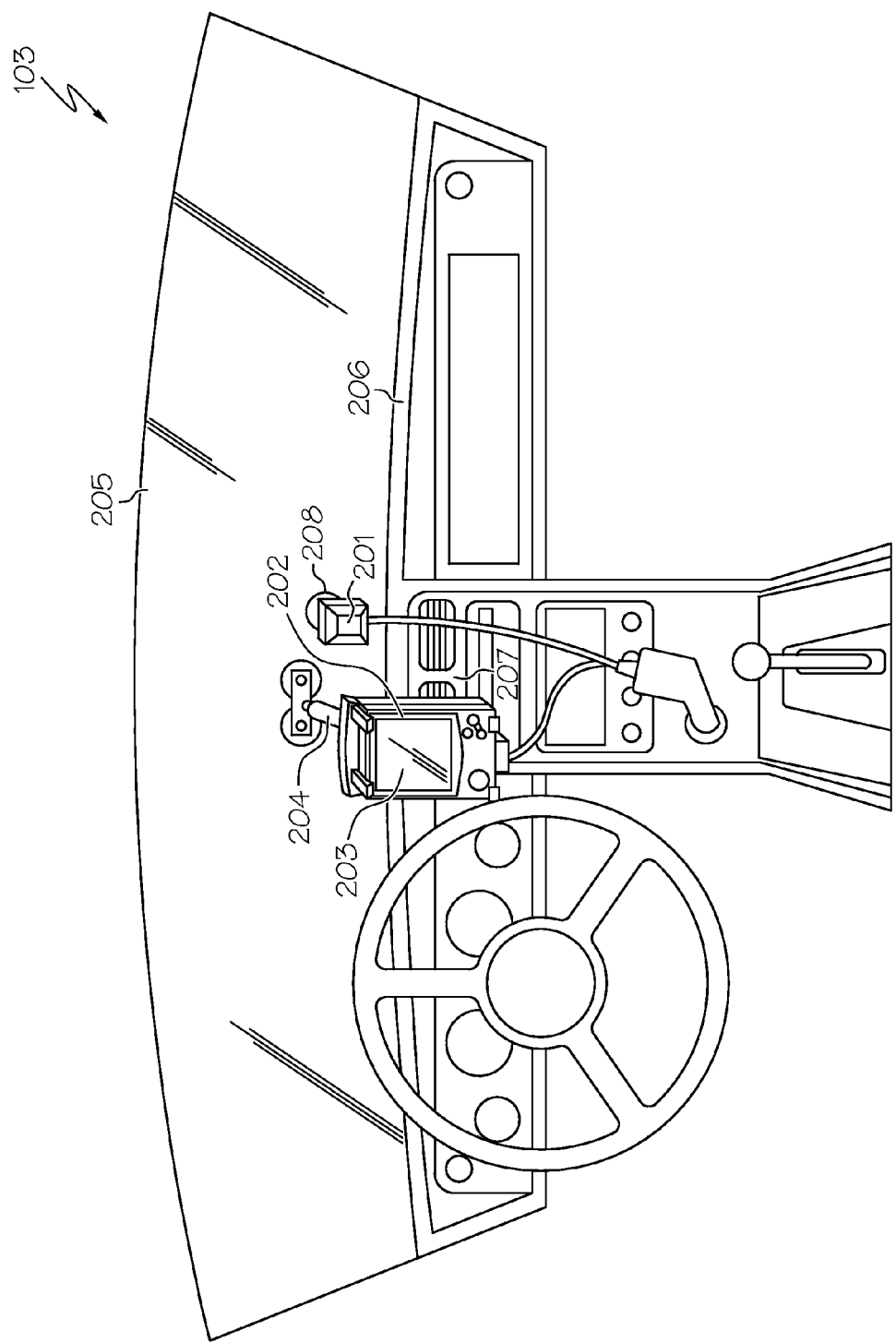
FIG. 2 is a perspective view showing a global positioning satellite receiver and a personal digital assistant used together in a vehicle in accordance with an embodiment of the present invention.
Figure 3:
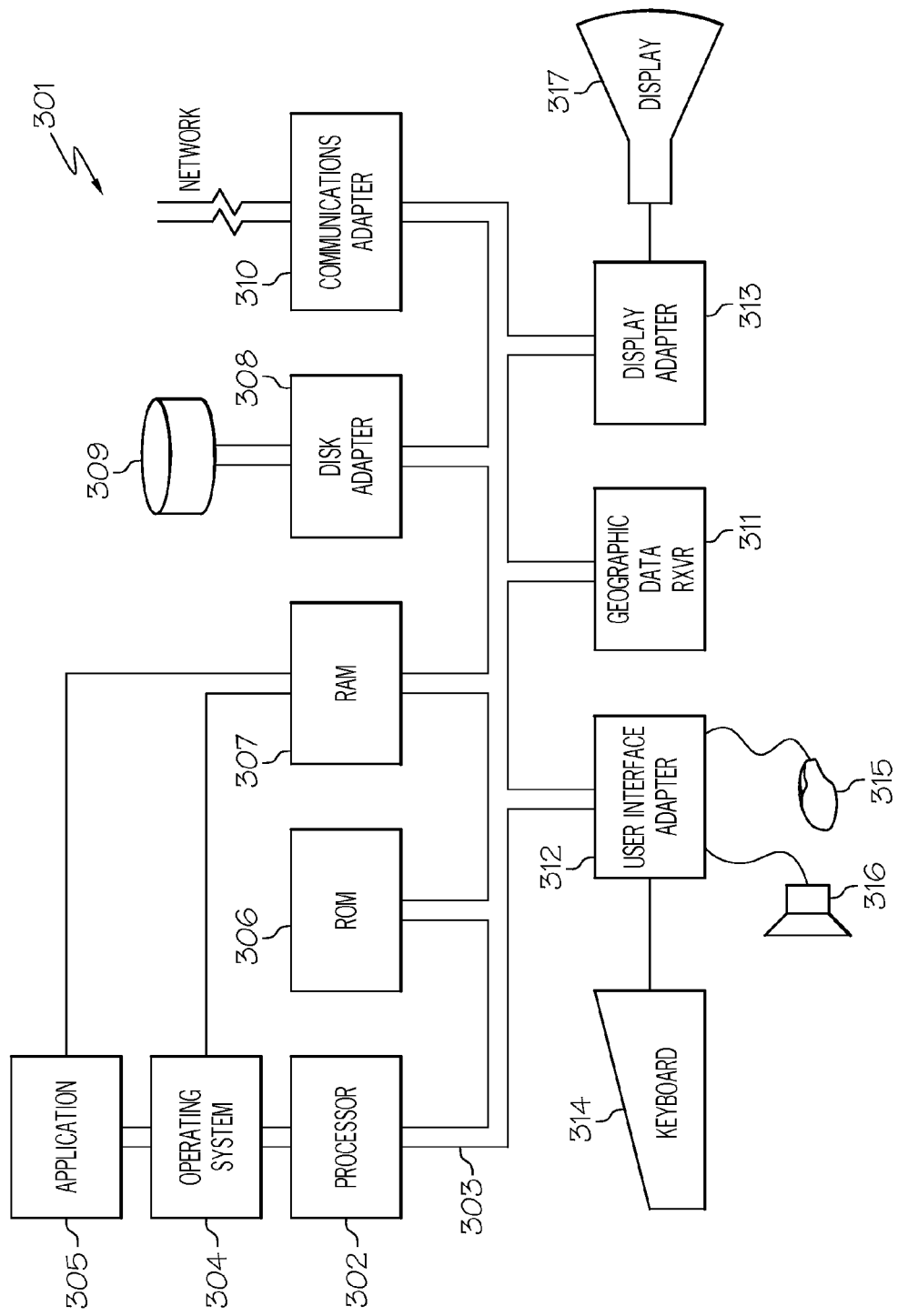
FIG. 3 illustrates an embodiment of the present invention of a hardware configuration of a laptop computer.
Figure 4:
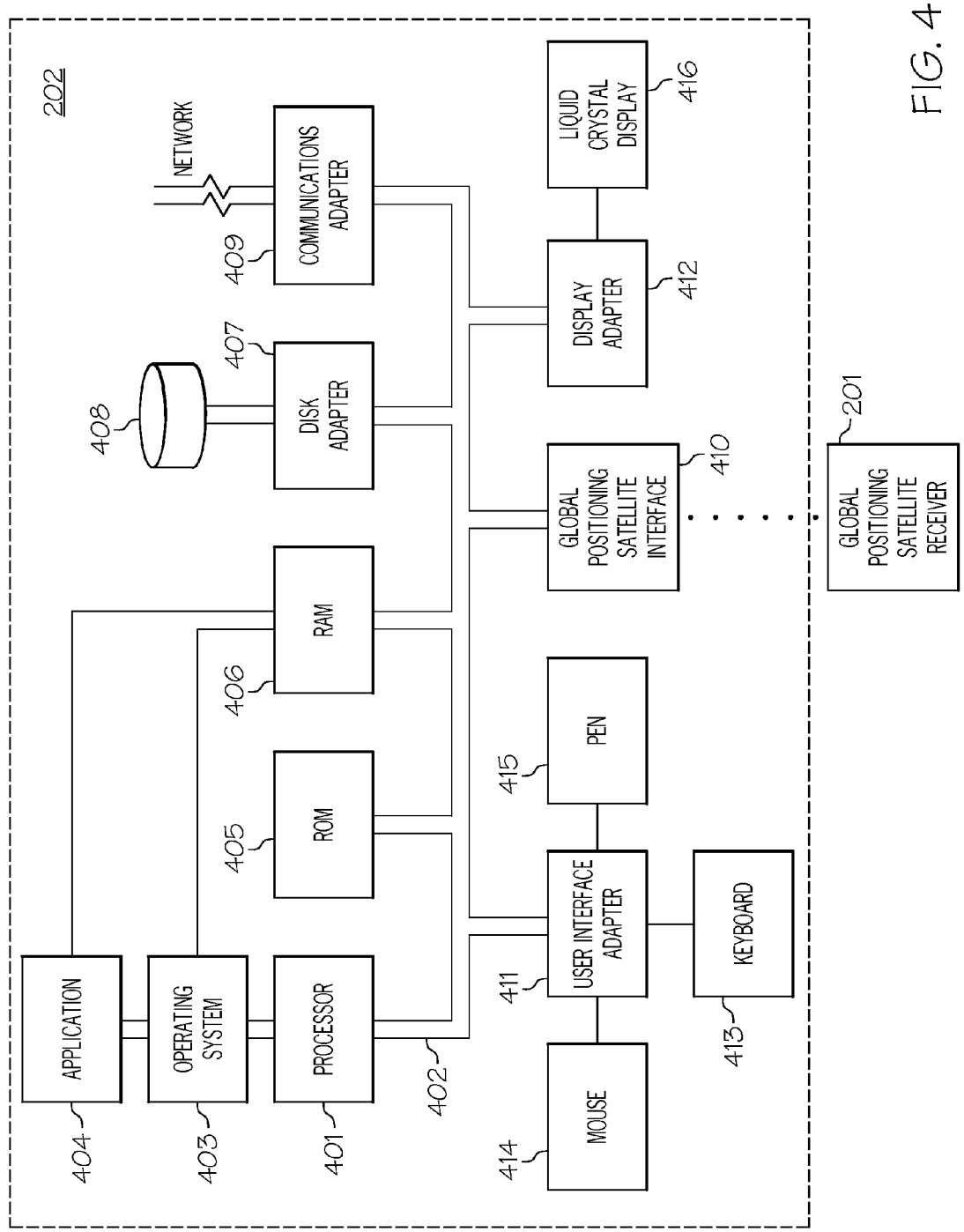
FIG. 4 illustrates an embodiment of the present invention of a hardware configuration of a personal digital assistant.
Figure 5A:
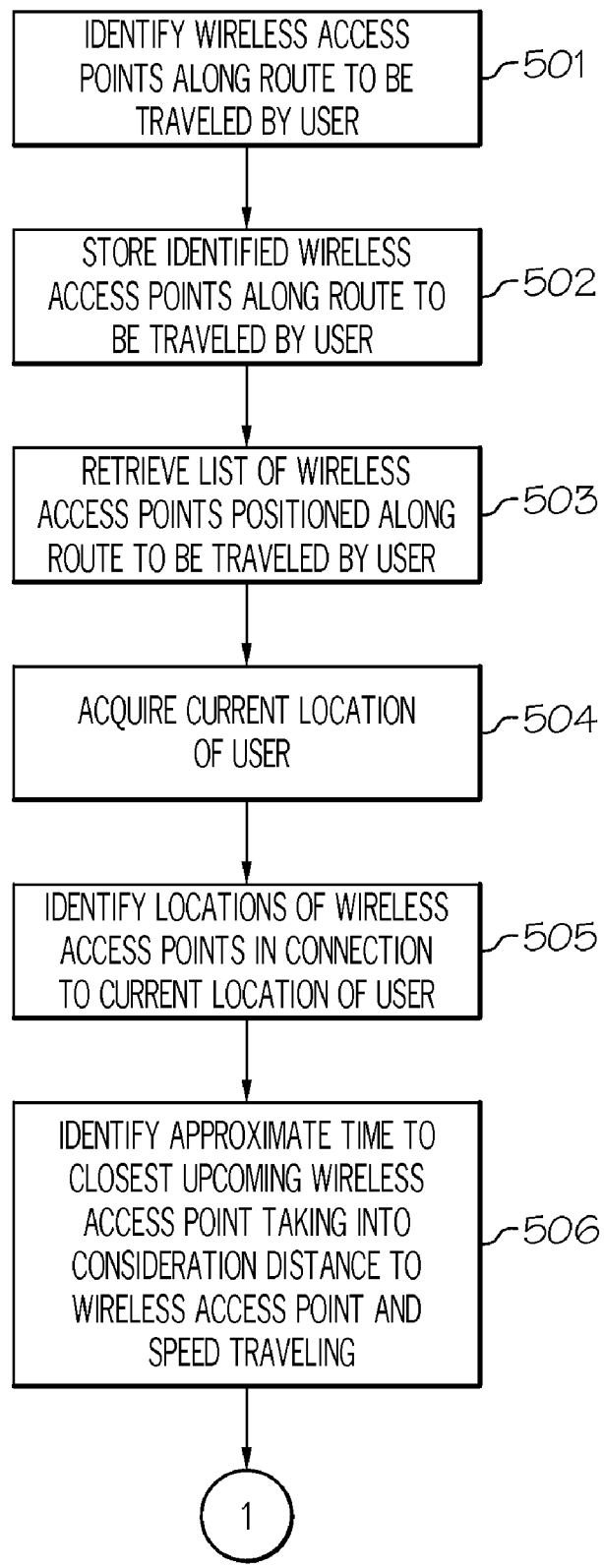
FIGS. 5A-C are a flowchart of a method for enhancing the acquisition of data from a wireless access point during a window of acquisition.
Figure 5B:
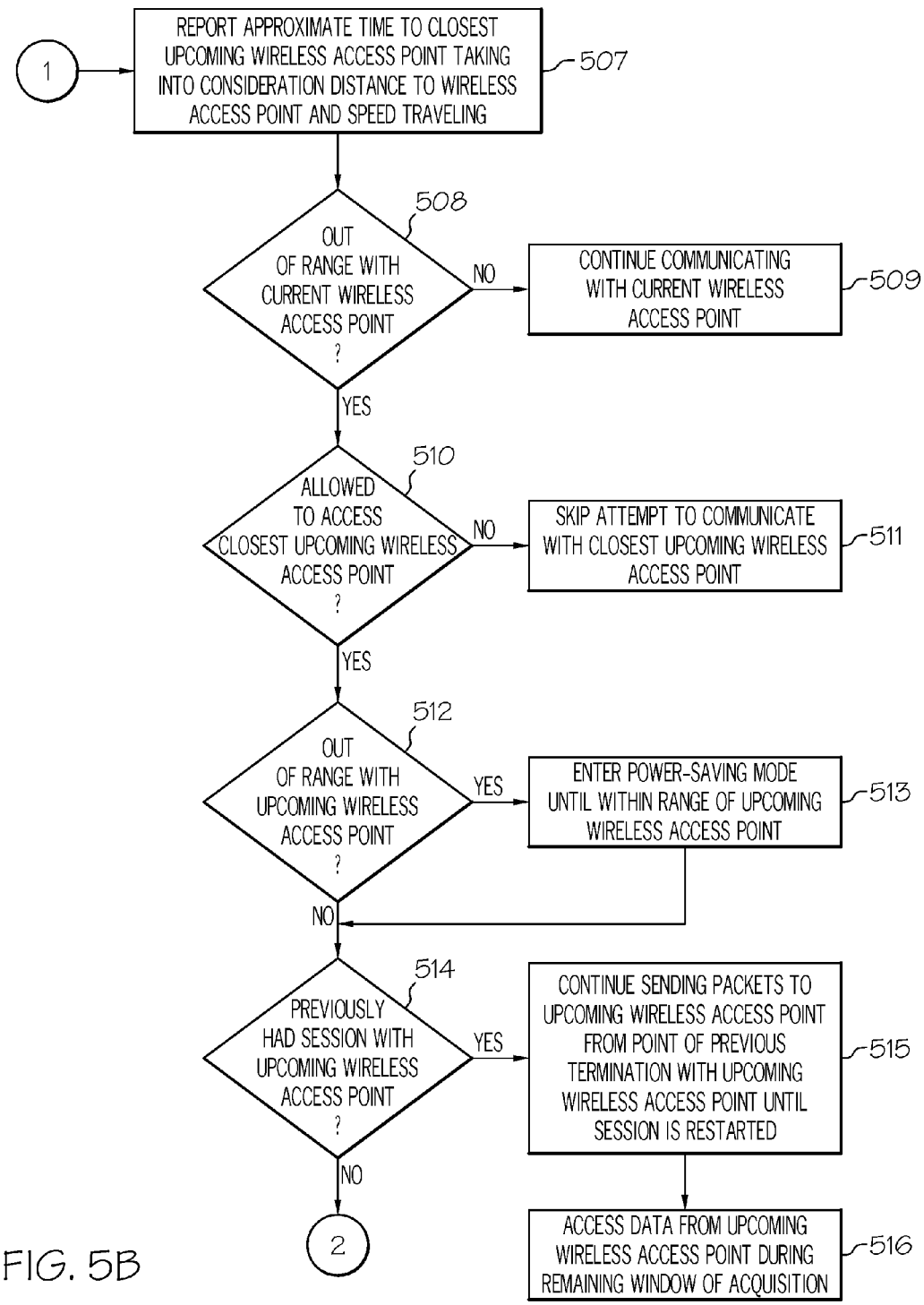
Figure 5C:
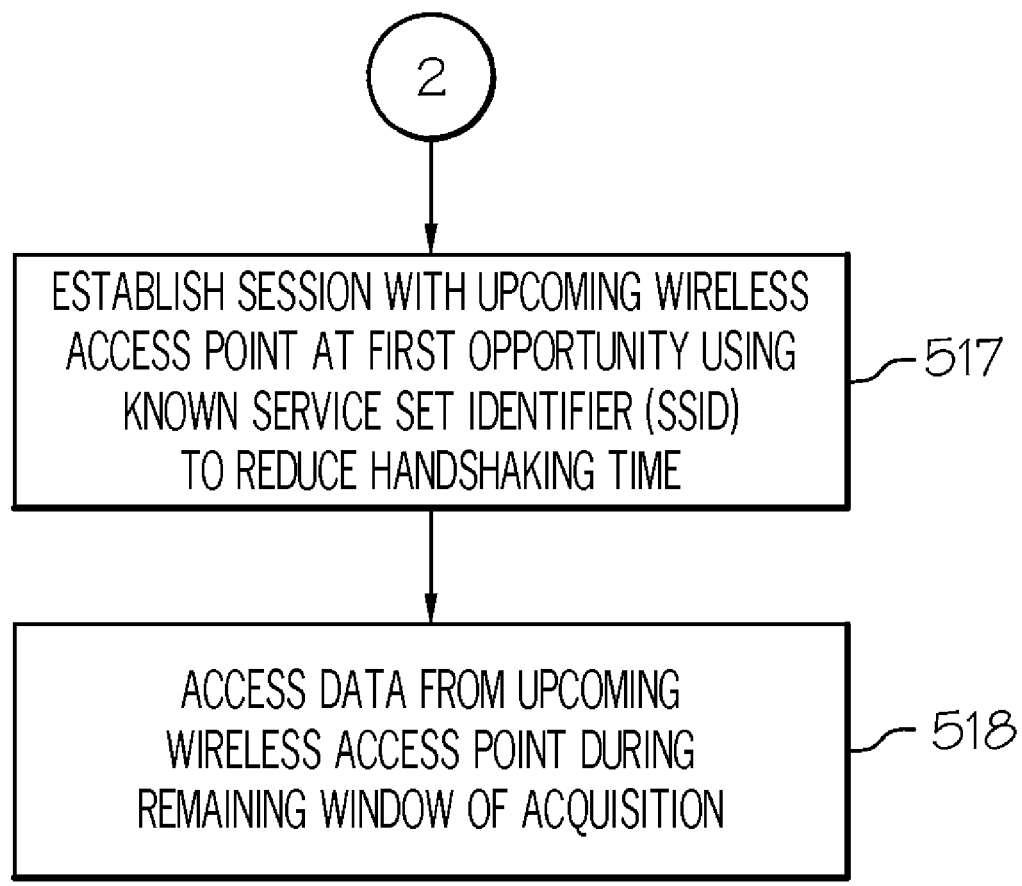

As discussed below in connection with FIGS. 1-4 and 5A-C, the amount of data accessed via the wireless access point during the window of acquisition (referring to the window of time in which a user may access data from the wireless access point) may be maximized due to taking advantage of advance identification of upcoming wireless access points. FIG. 1 is a diagram of a communication system including wireless access points positioned along a road which may be accessed by wireless devices. FIG. 2 is a perspective view of a global positioning satellite receiver and a personal digital assistant used together in a vehicle. FIG. 3 illustrates a hardware configuration of a laptop computer system. FIG. 4 illustrates a hardware configuration of a personal digital assistant. FIGS. 5A-C are a flowchart of a method for enhancing the acquisition of data from a wireless access point.

FIG. 1—Wireless Access Points Positioned Along Road

FIG. 1 is a diagram of a communication system 100 including wireless access points 101A-B positioned along a road 102 (e.g., highway) which may be accessed by wireless devices (e.g., laptop computer, personal digital assistant, cellular phone) used by a driver of a vehicle 103A-B traveling along road 102. Wireless access points 101A-B may collectively or individually be referred to as wireless access points 101 or wireless access point 101, respectively. In one embodiment, wireless access points 101 may be configured to retain session state information (e.g., last packet transmitted during the session with wireless device, session key) for a limited period of time. The session state information may be used by wireless devices to maximize the amount of data that can be accessed via wireless access point 101 during the limited window of opportunity to access data as discussed further below in connection with FIGS. 5A-C. Further, vehicles 103A-B may collectively or individually be referred to as vehicles 103 or vehicle 103, respectively.

Referring to FIG. 1, each wireless access point 101 may be coupled to a network 104 (while network 104 is shown in separate locations on FIG. 1, it is to be understood that each network 104 shown on FIG. 1 may be interpreted as either being the same network or another network). Network 104 may be coupled to a sever 105 (while server 105 is shown in separate locations on FIG. 1, it is to be understood that each server 105 shown on FIG. 1 may be interpreted as either being the same server or another server), which may be an e-mail server, a web server, etc. Additionally, network 104 may be coupled to a database 106 (while database 106 is shown in separate locations on FIG. 1, it is to be understood that each database 106 shown on FIG. 1 may be interpreted as either being the same database or another database), which may be configured to store a list of wireless access points positioned along a route to be traveled by a driver of vehicle 103 as discussed further below in connection with FIGS. 5A-C. Database 106 may further be configured to store WLAN access keys for use by wireless devices as discussed further below in connection with FIGS. 5A-C.

Communication system 100 may include any number of wireless access points 101, roads 102, vehicles 103, network's 104, servers 105 and databases 106. Further, FIG. 1 is illustrative of an embodiment of communication system 100 and FIG. 1 is not to be limited in scope to any one particular embodiment.

As discussed above, wireless access points 101 positioned along road 102 may be accessed by various wireless devices, such as a personal digital assistant. A discussion of a personal digital assistant used in combination with a global positioning satellite receiver is discussed below.

FIG. 2—A Global Positioning Satellite Receiver Used in Combination with a Personal Digital Assistant in a Vehicle FIG. 2 is a perspective view showing a global positioning satellite receiver 201 and a personal digital assistant 202 used together in a vehicle 103 in accordance with an embodiment of the present invention. In one embodiment, the driver of vehicle 103 may use personal digital assistant 202, such as a Microsoft™ Pocket PC™ or a Palm® portable computer, or a cellular phone (not shown), together with global positioning satellite receiver 201 as a mobile navigation system. With the appropriate software program installed and executing in personal digital assistant 202, the satellite signals received by global positioning satellite receiver 201 are processed and computed by personal digital assistant 202 and the instant location of the user (i.e., the driver) can be displayed on a map shown on a display screen 203 of personal digital assistant 202. It is noted that while FIG. 2 illustrates using a global positioning satellite system to determine the location of a user that the principles of the present invention may be extended to other technologies used to determine the location of a user. For example, cell phone tracking may be used to determine the location of a user.

Referring to FIG. 2 particularly, in one embodiment, there is shown a set up in a user's vehicle. Personal digital assistant 202 may be held by a mounting bracket 204 to a windshield 205 (as shown) or a dashboard 206 or an instrument panel 207, or other convenient places of vehicle 103. Global positioning satellite receiver 201 may be held by a retaining device 208 to windshield 205 (as shown) or dashboard 207 or other convenient places of vehicle 103.

In one embodiment, personal digital assistant 202 is positioned to be easily viewed by the user, and global positioning satellite receiver 201 is positioned at a location not shielded by the frame structure of vehicle 103 so that the sensitivity of global positioning satellite receiver 201 is not compromised.

As discussed above, wireless access points 101 (FIG. 1) positioned along road 102 (FIG. 1) may be accessed by various wireless devices, such as a laptop computer. A discussion of the hardware configuration of an embodiment of a laptop computer configured to practice the principles of the present invention is discussed below. It is noted that while the discussion below is in connection with a laptop computer that the discussion may also be applied to other wireless devices, such as a personal digital assistant or a cellular phone containing a geographic data receiver. While there may be some technical differences between a laptop computer and a personal digital assistant or a cellular phone, it is to be understand that such differences are not to limit the scope and breadth of the principles of the present invention in having a wireless device with the capability of receiving geographic data to determine the location of the wireless device.

FIG. 3—Hardware Configuration of Laptop Computer

FIG. 3 illustrates an embodiment of a hardware configuration of a laptop computer 301 which is representative of a hardware environment for practicing the present: invention. Laptop computer 301 may have a processor 302 coupled to various other components by system bus 303. An operating system 304 may run on processor 302 and provide control and coordinate the functions of the various components of FIG. 3. An application 305 in accordance with the principles of the present invention may run in conjunction with operating system 304 and provide calls to operating system 304 where the calls implement the various functions or services to be performed by application 305. Application 305 may include, for example, a program for enhancing the acquisition of data from a wireless access point as discussed further below in association with FIGS. 5A-C.

Referring to FIG. 3, read-only memory ("ROM") 306 may be coupled to system bus 303 and include a basic input/output system ("BIOS") that controls certain basic functions of computer system 301. Random access memory ("RAM") 307 and disk adapter 308 may also be coupled to system bus 303. It should be noted that software components including operating system 304 and application 305 may be loaded into RAM 307, which may be computer system's 301 main memory for execution. Disk adapter 308 may be an integrated drive electronics ("IDE") adapter that communicates with a disk unit 309, e.g., disk drive. It is noted that, the program for enhancing the acquisition of data from a wireless access point, as discussed further below in association with FIGS. 5A-C, may reside in disk unit 309 or in application 305.

Referring to FIG. 3, computer system 301 may further include a communications adapter 310 coupled to bus 303. Communications adapter 310 may interconnect bus 303 with a wireless access point 101 (FIG. 1) thereby gaining access to network 104 (FIG. 1) (e.g., local area network ("LAN"), wide area network ("WAN")). Communications adapter 310 may be a wireless card configured to store session state information (e.g., last packet transmitted during the session with wireless access point 101, session key, wireless access point 101 identifier) with wireless access points 101 for a limited period of time. The session state information may be used by laptop computer 301 to maximize the amount of data that can be accessed via wireless access point 101 during the limited window of opportunity to access data as discussed further below in connection with FIGS. 5A-C.

Computer system 301 may further receive geographic information via a geographic data receiver 311 (indicated as "Geographic Data RXVR" in FIG. 3). As is commonly known in the art, the geographic data receiver 311 uses triangulation to determine its location.

Referring to FIG. 3, input/output ("I/O") devices may also be connected to computer system 301 via a user interface adapter 312 and a display adapter 313. Keyboard 314, mouse 315 and speaker 316 may all be interconnected to bus 303 through user interface adapter 312. Data may be inputted to computer system 301 through any of these devices. A display monitor 317 may be connected to system bus 303 by display adapter 313. In this manner, a user is capable of inputting to computer system 301 through keyboard 314 or mouse 315 and receiving output from computer system 301 via display 317 or speaker 316.

The various aspects, features, embodiments or implementations of the invention described herein can be used alone or in various combinations. The methods of the present invention can be implemented by software, hardware or a combination of hardware and software. The present invention can also be embodied as computer readable code on a computer readable medium. The computer readable medium is any data storage device that can store data which can thereafter be read by a computer system. Examples of the computer readable medium include read-only memory, random access memory, CD-ROMs, flash memory cards, DVDs, magnetic tape, optical data storage devices, and carrier waves. The computer readable medium can also be distributed over network-coupled computer systems so that the computer readable code is stored and executed in a distributed fashion.

As discussed above, wireless access points 101 (FIG. 1) positioned along road 102 (FIG. 1) may be accessed by various wireless devices, such as personal digital assistant 202 (FIG. 2) used in conjunction with a global positioning satellite receiver 201 (FIG. 2) as illustrated in FIG. 2. A discussion of the hardware configuration of an embodiment of personal digital assistant 202 (FIG. 2) configured to practice the principles of the present invention is discussed below. It is noted that while the discussion below is in connection with a personal digital assistant that the discussion may also be applied to other wireless devices, such as a cellular phone, that is connected to a global positioning satellite receiver.

FIG. 4—Hardware Configuration of Personal Digital Assistant

FIG. 4 illustrates an embodiment of a hardware configuration of personal digital assistant 202 (FIG. 2) which is representative of a hardware environment for practicing the present invention. Personal digital assistant 202 may have a processor 401 coupled to various other components by system bus 402. An operating system 403 may run on processor 401 and provide control, and coordinate the functions of the various components of FIG. 4. An application 404 in accordance with the principles of the present invention may run in conjunction with operating system 403 and provide calls to operating system 403 where the calls implement the various functions or services to be performed by application 404. Application 404 may include, for example, a program for enhancing the acquisition of data from a wireless access point as discussed further below in association with FIGS. 5A-C.

Referring to FIG. 4, read-only memory ("ROM") 405 may be coupled to system bus 402 and include a basic input/output system ("BIOS") that controls certain basic functions of personal digital assistant 202. Random access memory ("RAM") 406 and disk adapter 407 may also be coupled to system bus 402. It should be noted that software components including operating system 403 and application 404 may be loaded into RAM 406, which may be personal digital assistant's 202 main memory for execution. Disk adapter 407 may be an integrated drive electronics ("IDE") adapter that communicates with a disk unit 408. e.g., disk drive. It is noted that the program for enhancing the acquisition of data from a wireless access point, as discussed further below in association with FIGS. 5A-C, may reside in disk unit 408 or in application 404.

Referring to FIG. 4, personal digital assistant 202 may further include a communications adapter 409 coupled to bus 402. Communications adapter 409 may interconnect bus 402 with a wireless access point 101 (FIG. 1) thereby gaining access to network 104 (FIG. 1) (e.g., local area network ("LAN"), wide area network ("WAN")). Communications adapter 409 may be a wireless card configured to store session state information (e.g., last packet transmitted during the session with wireless access point 101, session key, wireless access point 101 identifier) with wireless access points 101 for a limited period of time. The session state information may be used by personal digital assistant 202 to maximize the amount of data that can be accessed via wireless access point 101 during the limited window of opportunity to access data as discussed further below in connection with FIGS. 5A-C.

Personal digital assistant 202 may further receive geographic information from global positioning satellite receiver 201 via a global positing satellite interface 410 coupled to bus 402. As is commonly known in the art, the global positioning satellite receiver 201 uses triangulation to determine its location.

Referring to FIG. 4, input/output ("I/O") devices may also be connected to personal digital assistant 202 via a user interface adapter 411 and a display adapter 412. Keyboard 413, mouse 414 and pen 415 may all be interconnected to bus 402 through user interface adapter 411. Data may be inputted to personal digital assistant 202 through any of these devices. A liquid crystal display 416 may be connected to system bus 402 by display adapter 412. In this manner, a user is capable of inputting to personal digital assistant 202 through keyboard 413, mouse 414 or pen 415 and receiving output from personal digital assistant 202 via display 416.

The various aspects, features, embodiments or implementations of the invention described herein can be used alone or in various combinations. The methods of the present invention can be implemented by software, hardware or a combination of hardware and software. The present invention can also be embodied as computer readable code on a computer readable medium. The computer readable medium is any data storage device that can store data which can thereafter be read by a computer system. Examples of the computer readable medium include read-only memory, random access memory, CD-ROMs, flash memory cards, DVDs, magnetic tape, optical data storage devices, and carrier waves. The computer readable medium can also be distributed over network-coupled computer systems so that the computer readable code is stored and executed in a distributed fashion.

As discussed above, the amount of data accessed via the wireless access point during the window of acquisition (referring to the window of time in which a user may access data from the wireless access point) may be maximized due to taking advantage of advance identification of upcoming wireless access points. FIGS. 5A-C are a flowchart of a method for enhancing the acquisition of data from a wireless access point by taking advantage of advance identification of upcoming wireless access points. A discussion of FIGS. 5A-C is provided below.

FIGS. 5A-C—Method for Enhancing Acquisition of Data from a Wireless Access Point FIGS. 5A-C are a flowchart of a method 500 for enhancing the acquisition of data from wireless access point 101 (FIG. 1) during a window of acquisition (referring to the window of time in which a user may access data from the wireless access point) by taking advantage of advance identification of upcoming wireless access points 101 in accordance with an embodiment of the present invention.

Referring to FIG. 5A, in conjunction with FIGS. 1-4, in step 501, wireless access points 101 are identified along a route (e.g., toad 102) to be traveled by a user (e.g., driver of vehicle 103B). In one embodiment, wireless access points 101 may be identified automatically by a wireless device in vehicle 103 as vehicle 103 travels down the route (e.g., road 102). In another embodiment, an individual may manually identify or map out the location of wireless access points 101 positioned along the route (e.g. road 102).

In step 502, the identified wireless access points 101 along the route (e.g., road 102) are stored, such as a list of wireless access points 101. In one embodiment, the identified wireless access points 101 are stored in a storage unit, such as disk unit 309, disk unit 408, when wireless device identities wireless access points 101 along the route. In another embodiment, the identified wireless access points 101 are stored in a database 106 which may be publicly accessible, such as via network 104.

In step 503, the wireless device (e.g., laptop computer 301, personal digital assistant 202) retrieves a list of wireless access points positioned along a route to be traveled by a user. For example, the wireless device may retrieve the list of wireless access points positioned along a route to be traveled by a user from database 106 by accessing network 104 via wireless access point 101. In another embodiment, the wireless device may retrieve the list of wireless access points positioned along a route to be traveled by a user from a storage unit of the wireless device (e.g., disk unit 309, disk unit 408). In another embodiment, the wireless device may retrieve the list of wireless access points 101 over an FM broadcast.

In step 504, the wireless device (e.g., laptop computer 301, personal digital assistant 202) acquires the current location of the user. In one embodiment, the wireless device may include a geographic data receiver 311 configured to receive geographic information which may provide the location of the wireless device via triangulation. In another embodiment, the wireless device may receive positional information from a global positioning satellite receiver 201 via a global positioning satellite interface 410. In yet another embodiment, the wireless device may receive triangulation or signal strength information from one or more Radio Frequency (RF) sources, such as a cellular phone tower.

In step 505, the wireless device (e.g., laptop computer 301, personal digital, assistant 202) identifies the locations of wireless access points 101 in connection to the current location of the user. For example, the wireless device (e.g., laptop computer 301, personal digital assistant 202) identifies the distance these wireless access points 101 are positioned from the current location of the user.

In step 506, the wireless device (e.g., laptop computer 301, personal digital assistant 202) identifies the approximate time to the closest upcoming wireless access point 101 (e.g., wireless access point 101A is the closest wireless access point to vehicle 103B) taking into consideration the distance to the closest wireless access point and the speed traveling. It is noted that "upcoming wireless access point," as used herein, refers to the closest wireless access point that vehicle 103 is approaching along road 102. In one embodiment, the wireless device determines the speed vehicle 103 is traveling by receiving input from an odometer sensor of vehicle 103. In one embodiment, an odometer sensor or some like device may transmit speed information, such as via wirelessly, to the wireless device. In one embodiment, the wireless device has a receiver configured to receive the transmitted speed information.

Referring to FIG. 5B, in connection with FIGS. 1-4, in step 507, the wireless device (e.g., laptop computer 301, personal digital assistant 202) reports to the user the approximate time to the upcoming wireless access point 101 taking into consideration the distance to the closest wireless access point and the speed traveling. For example, the wireless device may report to the user the approximate time to the upcoming wireless access point 101 via display 317, display 416.

In step 508, the wireless device (e.g., laptop computer 301, personal digital assistant 202) determines if the wireless device is out of range with the current wireless access point 101 that is being accessed by the wireless device. If the wireless device is not out of range with the current wireless access point 101 that is being accessed by the wireless device, then, in step 509, the wireless device continues to communicate with the current wireless access point 101. The wireless device may also initiate simultaneous WLAN connection so that it can quickly switch from an unresponsive WLAN to the next WLAN in the route.

If, however, the wireless device is out of range with the current wireless access point 101 that is being accessed by the wireless device, then, in step 510, the wireless device (e.g., laptop computer 301, personal digital assistant 202) determines if it is allowed to access the upcoming wireless access point 101. For example, the wireless device may not have a key (numeric code that is used to encrypt data for security purposes) that allows access to the upcoming wireless access point 101. The wireless access point location database 106 may be capable of storing WLAN access keys for use by the wireless device. The keys in database 106 may be accessible by authorized individuals (e.g., individuals who have obtained the keys by prior arrangement with the WLAN owner, individuals who belong to a certain organization, individuals who are employed by a certain employer, individuals who are paying for access to such keys). If, however, the wireless device is not authorized to have a key for the upcoming wireless access point 101, then the wireless device may not be able to retrieve that key from database 106.

If the wireless device (e.g., laptop computer 301, personal digital assistant 202) is not allowed to access the upcoming wireless access point 101, then, in step 511, the wireless device skips the attempt to communicate with the upcoming wireless access point 101. By skipping the attempt to communicate with the upcoming wireless access point 101, the wireless device may deactivate the wireless card (e.g., wireless adapter 310, 409) thereby preserving battery life until the next upcoming wireless access point 101 that the wireless device may access. In another embodiment, the wireless device may enter a power-saving mode if the wireless device is not allowed to access the upcoming wireless access point 101.

If, however, the wireless device (e.g., laptop computer 301, personal digital assistant 202) is allowed to access the upcoming wireless access point 101, then, in step 512, the wireless device (e.g., laptop computer 301, personal digital assistant 202) determines if it is out of range with the upcoming wireless access point 101. If the wireless device is out of range with the upcoming wireless access point 101, then, in step 513, the wireless device enters a power-saving mode of operation until within the signal range of the upcoming wireless access point 101 to preserve battery life. Alternatively, the wireless device may deactivate the wireless card (e.g., wireless adapter 310, 409) until within the signal range of the upcoming wireless access point 101 to preserve battery life.

If however, the wireless device (e.g., laptop computer 301, personal digital assistant 202) is within the signal range of the upcoming wireless access point 101, then, the wireless device communicates with the upcoming wireless access point 101 at the earliest opportunity within the window of acquisition as discussed below in connection with steps 514-518.

In step 514, the wireless device (e.g., laptop computer 301, personal digital assistant 202) determines if it previously had a session with the upcoming wireless access point 101.

If the wireless device (e.g., laptop computer 301, personal digital assistant 202) had previously had a session with the upcoming wireless access point 101, then, in step 515, the wireless device continues sending packets to the upcoming wireless access point 101 from the point of previous termination with the upcoming wireless access point 101 until the session is restarted. For example, the wireless device may have stored the session key, such as in disk unit 309, 408, it used during its previous session with the upcoming wireless access point 101. The session key may be used to encrypt data transmitted to the upcoming wireless access point 101. Further, the wireless device may have stored, such as in disk unit 309, 408, the packet number that was last transmitted in its previous session with the upcoming wireless access point 101. By transmitting the next successive packet number, the wireless device attempts to reestablish the session with the upcoming wireless access point 101 in a shorter time than the time it takes to establish a new session with wireless access point 101. In one embodiment, the wireless device rapidly repeats transmission of the next successive packet number until receiving a response from the upcoming wireless access point 101. Hence, the wireless device may start transmitting packets in anticipation of imminent reception of the packets by the upcoming wireless access point 101 prior to detecting the upcoming wireless access point 101.

In step 516, the wireless device (e.g., laptop computer 301, personal digital assistant 202) accesses data from the upcoming wireless access point 101 during the remaining window of acquisition (i.e., the remaining amount of time to acquire data after the session is reestablished). The window of acquisition may refer to the window of time in which a user may access data from wireless access point 101. By reducing the amount of time to establish a session with wireless access point 101, there is more time to access data from wireless access point 101.

If, however, the wireless device (e.g., laptop computer 301, personal digital assistant 202) had not previously had a session with the upcoming wireless access point 101, then, in step 517, the wireless device establishes a session with the upcoming wireless access point 101 at the first opportunity within the window of acquisition using the known Service Set IDentifier (SSID) to reduce the handshaking time. The SSID may be obtained from the list of wireless access points 101 retrieved by the wireless device. By reducing the handshaking time and/or the handshaking retry interval, there will be more time during the window of acquisition to transmit data to and access data from wireless access point 101.

In step 518, the wireless device (e.g., laptop computer 301, personal digital assistant 202) accesses data from the upcoming wireless access point 101 during the remaining window of acquisition. As stated above, the window of acquisition may refer to the window of time in which a user may access data from wireless access point 101.

Method 500 may include other and/or additional steps that, for clarity, are not depicted. Further, method 500 may be executed in a different order presented and that the order presented in the discussion of FIGS. 5A-C is illustrative. Additionally, certain steps in method 500 may be executed in a substantially simultaneous manner or may be omitted.

Although the method, system and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims, it is noted that the headings are used only for organizational purposes and not meant to limit the scope of the description or claims.

The invention claimed is:

1. A method for enhancing acquisition of data from a wireless access point, the method comprising:
    retrieving a list of wireless access points;
    acquiring a current location of a user;
    identifying locations of wireless access points from said list of wireless access points in connection to said current location of said user;
    identifying a closest wireless access point in connection to said current location of said user; and
    transmitting packets to said closest wireless access point from a point of previous termination with said closest wireless access point until a session is restarted with said closest wireless access point in response to a wireless device of said user previously having had said session with said closest wireless access point, wherein said packets that are transmitted comprises a next successive packet number from a packet number that was last transmitted in said wireless device's previous session with said closest wireless access point.

2. The method as recited in claim 1 further comprising:
    identifying an approximate time to said closest wireless access point taking into consideration distance to said closest wireless access point and speed traveling.

3. The method as recited in claim 2 further comprising:
    reporting said approximate time to said closest wireless access point.

4. The method as recited in claim 1 further comprising:
    skipping an attempt to communicate with said closest wireless access point in response to said user not being allowed access to said closest wireless access point.

5. The method as recited in claim 1 further comprising:
    establishing a session with said closest wireless access point at an earliest opportunity within a window of time for acquisition using a known wireless access point identifier to reduce handshaking time in response to said user not previously having had a session with said closest wireless access point; and
    accessing data from said closest wireless access point during a remaining of said window of time for acquisition.

6. The method as recited in claim 1 further comprising:
    accessing data from said closest wireless access point during a remaining of a window of time for acquisition.

7. The method as recited in claim 1 further comprising:
    entering a power-saving mode in response to said user not being within range to access said closest wireless access point.

8. The method as recited in claim 1 further comprising:
    accessing a database storing said list of wireless access points positioned along a route to be traveled by said user.

9. A system, comprising:
    a memory unit for storing a computer program for enhancing acquisition of data from a wireless access point; and
    a processor coupled to said memory unit, wherein said processor, responsive to said computer program, comprises:
        circuitry for retrieving a list of wireless access points;
        circuitry for acquiring a current location of said user;
        circuitry for identifying locations of wireless access points from said list of wireless access points in connection to said current location of said user;
        circuitry for identifying a closest wireless access point in connection to said current location of said user; and
        circuitry for transmitting packets to said closest wireless access point from a point of previous termination with said closest wireless access point until a session is restarted with said closest wireless access point in response to a wireless device of said user previously having had said session with said closest wireless access point, wherein said packets that are transmitted comprises a next successive packet number from a packet number that was last transmitted in said wireless device's previous session with said closest wireless access point.

10. The system as recited in claim 9, wherein said processor further comprises:
    circuitry for identifying an approximate time to said closest wireless access point taking into consideration distance to said closest wireless access point and speed traveling.

11. The system as recited in claim 9, wherein said processor further comprises
    circuitry for accessing data from said closest wireless access point during a remaining of a window of time for acquisition.

12. The system as recited in claim 9, wherein said processor further comprises:
    circuitry for skipping an attempt to communicate with said closest wireless access point in response to said user not being allowed access to said closest wireless access point.

13. The system as recited in claim 9, wherein said processor further comprises:
    circuitry for establishing a session with said closest wireless access point at an earliest opportunity within a window of time for acquisition using a known wireless access point identifier to reduce handshaking time in response to said user not previously having had a session with said closest wireless access point; and
    circuitry for accessing data from said closest wireless access point during a remaining of said window of time for acquisition.

14. The system as recited in claim 9, wherein said processor further comprises:
    circuitry for accessing a database storing said list of wireless access points positioned along a route to be traveled by said user.

15. A computer program product embodied in a computer readable storage medium for enhancing acquisition of data from a wireless access point, the computer program product comprising the programming instructions for:
    retrieving a list of wireless access points;
    acquiring a current location of said user;
    identifying locations of wireless access points from said list of wireless access points in connection to said current location of said user;
    identifying a closest wireless access point in connection to said current location of said user; and
    transmitting packets to said closest wireless access point from a point of previous termination with said closest wireless access point until a session is restarted with said closest wireless access point in response to a wireless device of said user previously having had said session with said closest wireless access point, wherein said packets that are transmitted comprises a next successive packet number from a packet number that was last transmitted in said wireless device's previous session with said closest wireless access point.

16. The computer program product as recited in claim 15 further comprising the programming instructions for:

identifying an approximate time to said closest wireless access point taking into consideration distance to said closest wireless access point and speed traveling.

17. The computer program product as recited in claim 15 further comprising the programming instructions for:

accessing data from said closest wireless access point during a remaining of a window of time for acquisition.

18. The computer program product as recited in claim 15 further comprising the programming instructions for:

skipping an attempt to communicate with said closest wireless access point in response to said user not being allowed access to said closest wireless access point.

19. The computer program product as recited in claim 15 further comprising the programming instructions for:

establishing a new session with said closest wireless access point at an earliest opportunity within a window of time for acquisition using a known wireless access point identifier to reduce handshaking time in response to said user not previously having had a session with said closest wireless access point; and accessing data from said closest wireless access point during a remaining of said window of time for acquisition.

20. The computer program product as recited in claim 15 further comprising the programming instructions for:

accessing a database storing said list of wireless access points positioned along a route to be traveled by said user.

* * * * *